Figure 4:
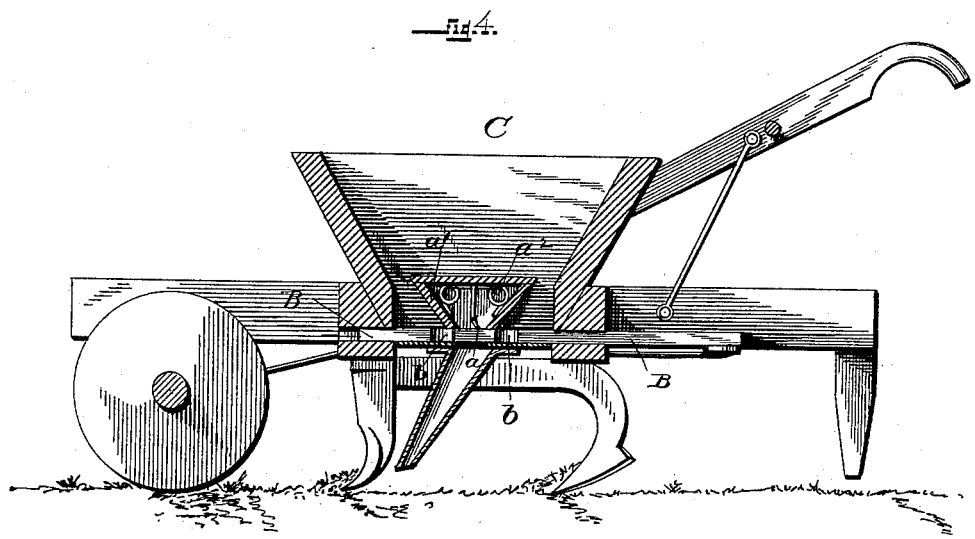

(No Model.) 2 Sheets—Sheet 1.
E. E. MARSHALL.
FEEDING DEVICE FOR PLANTERS AND DISTRIBUTERS.
No. 395,286. Patented Dec. 25, 1888.
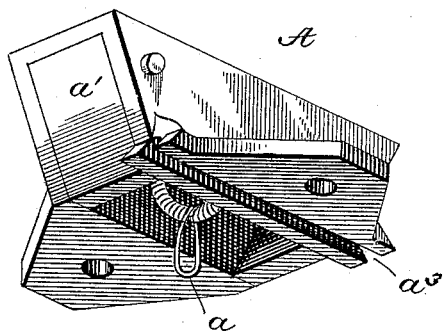
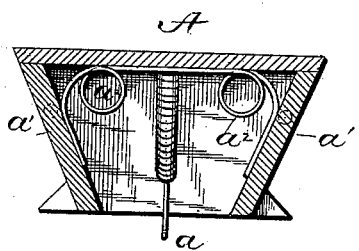
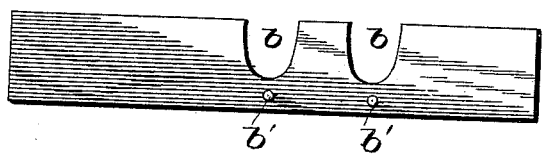
Witnesses:
W. W. Mortimer
R. W. Elliott
Inventor:
Eugene Ellis Marshall,
by R. S. D. Newforth,
his Attorney (No Model.) 2 Sheets—Sheet 2.

E. E. MARSHALL.
FEEDING DEVICE FOR PLANTERS AND DISTRIBUTERS.

No. 395,286. Patented Dec. 25, 1888.

Witnesses:

Inventor:
Eugene Ellis Marshall,
by R. S. Dyrenforth,
his Attorney

UNITED STATES PATENT OFFICE.

EUGENE ELLIS MARSHALL, OF NEAR LOUISBURG, NORTH CAROLINA, ASSIGNOR OF TWO-THIRDS TO ARTHUR ARRINGTON AND J. K. SPENCER, OF SAME PLACE.

FEEDING DEVICE FOR PLANTERS AND DISTRIBUTERS.

SPECIFICATION forming part of Letters Patent No. 395,286, dated December 25, 1888.

Application filed March 14, 1888. Serial No. 267,193. (No model.)

*To all whom it may concern:*

Be it known that I, EUGENE ELLIS MARSHALL, a citizen of the United States, residing near Louisburg, in the county of Franklin and State of North Carolina, have invented certain new and useful Improvements in Feeding Devices for Planters, Distributers, &c.; and I do hereby declare the following to be a full, clear, and exact description of the invention, such as will enable others skilled in the art to which it appertains to make and use the same.

This invention relates to planters and distributers.

The object is to produce a device to be used in connection with planters and distributers, by which any clogging or packing of the substance fed and consequent mutilation of substance fed—such as grain—will be prevented; furthermore, to produce a device which shall be simple of construction, efficient and durable in use, and comparatively inexpensive of production.

With these objects in view my invention resides in an attachment for planters consisting in a casing or housing having yielding walls and arranged above the outlet-opening; furthermore, in an attachment for planters consisting in a feed-slide having openings and a casing or housing having yielding walls arranged above the feed-slide; furthermore, in an attachment for planters consisting in a feed-slide, a housing or casing arranged above the slide, and a spring-finger or spring-fingers arranged within the housing, and, finally, in certain details of construction hereinafter described and claimed.

In the accompanying drawings, forming part of this specification, I have illustrated one form of device embodying my invention, although there are many ways of carrying the same into effect.

In the drawings, Figure 1 is a perspective view showing the elastic spring-finger seated in its casing or housing, showing also the housing with a groove at one side of its under surface. Fig. 2 is a longitudinal sectional view of the feeding device, showing the spring-seated finger and the yielding parts of the housing. Fig. 3 is a plan view of the preferred feed-slide, showing the peculiar openings in the same and the projections or studs. Fig. 4 is a longitudinal sectional view of a planter or distributer, showing the feeding device in situation for use.

Referring to the drawings, A designates the casing or housing, of any suitable material, but preferably of metal. Within this casing is placed a resilient or spring finger, $a$, which may be constructed of a piece of metal pivoted at its upper end to the top of the casing, or formed by an elongated loop of a coiled spring mounted on a bar and secured to the sides of the casing, or in any other desirable manner.

$a'$ designates the ends of the casing, which are so constructed as to admit of motion inward where pressure is brought to bear from without, and which are kept in a proper position by means of a spring, $a^2$, or other suitable device, which also acts to cause them to resume their normal position when moved in the operation of the machine.

B designates a slide, which moves under the casing or housing, having a number of openings, $b$, entering its side, which engage the spring-finger and operate it at each movement of the slide, and also having a number of studs or projections, $b'$, which are designed to act as stirrers, and when in operation move in a groove, $a^3$, cut in one side of the under surface of the housing or casing.

The manner of operating this device is illustrated in Fig. 4, where it is shown secured to the bottom portion of a planter and distributer directly over the discharge-opening.

When the apparatus is being worked for the purpose of, say, planting, the box or hopper C is filled with grain or seed, and the slide B is operated by suitable mechanism to impart to it a reciprocating motion, so that the openings $b$ are brought alternately over a corresponding opening or openings in the bottom of the hopper. The openings in the slide are made of sufficient size to allow any desired quantity of the substance to escape; but should a larger amount enter the opening than can escape easily, or should the substance become packed or jammed, the slide in passing back brings the substance in contact with the movable ends, pressing them inward, and thus preventing the substance from being mashed or mutilated. The finger *a* then strikes against the substance and dislodges it, thereby causing it to drop from the opening in the bottom of the hopper.

Having thus fully described my invention, what I claim as new, and desire to secure by Letters Patent, is—

1. The combination, with a feed-slide, of a casing or housing having yielding walls to prevent crushing or jamming in the operation of the machine, substantially as described.

2. The combination, with a feed-slide having openings, of the casing or housing having yielding walls to prevent crushing or jamming in the operation of the machine, substantially as described.

3. The combination, with the feed-slide having openings, of the casing or housing having yielding walls, and a spring-finger or spring-fingers located within the casing or housing, substantially as described.

4. The combination, with the feed-slide having projections, the casing or housing having yielding parts and provided with a groove, and a spring-finger or spring-fingers, substantially as described.

5. The combination, with the feed-slide provided with discharge-openings and with projections forming stirrers, of the casing or housing having yielding walls and the groove, and the spring-finger or spring-fingers arranged within the housing, substantially as described.

In testimony whereof I affix my signature in presence of two witnesses.

EUGENE ELLIS MARSHALL.

Witnesses:
   O. H. HARRIS,
   W. H. FURMAN, Jr.